United States Patent
Wang

(10) Patent No.: US 7,487,958 B2
(45) Date of Patent: Feb. 10, 2009

(54) ANTI-VIBRATION MECHANISM FOR DENTAL IMPRESSION MATERIAL MIXER

(76) Inventor: Shu-Lung Wang, 6F, No. 70, Sec. 1, Kuang-Fu Rd., San-Chung City, Taipei Hsien (TW)

( * ) Notice: Subject to any disclaimer, the term of this patent is extended or adjusted under 35 U.S.C. 154(b) by 227 days.

(21) Appl. No.: 11/125,191

(22) Filed: May 10, 2005

(65) Prior Publication Data
US 2006/0254869 A1 Nov. 16, 2006

(51) Int. Cl.
*F16M 1/00* (2006.01)
*F16M 3/00* (2006.01)
*F16M 5/00* (2006.01)
*F16M 7/00* (2006.01)
*F16M 9/00* (2006.01)
*F16M 11/00* (2006.01)

(52) U.S. Cl. .................. 267/136; 188/378; 366/217

(58) Field of Classification Search ......... 267/136–137, 267/150, 378; 248/605, 560, 562, 603, 636–638, 248/609, 621, 581; 188/378, 379, 380; 366/217; 494/82; 74/572.4
See application file for complete search history.

(56) References Cited

U.S. PATENT DOCUMENTS

| | | | | |
|---|---|---|---|---|
| 4,619,532 A | * | 10/1986 | Schmidt, III | 366/110 |
| 4,769,824 A | * | 9/1988 | Seki | 372/107 |
| 4,972,930 A | * | 11/1990 | Davis | 188/379 |
| 6,371,434 B1 | * | 4/2002 | Becker et al. | 248/610 |
| 6,953,279 B2 | * | 10/2005 | Midas et al. | 366/217 |
| 7,182,506 B2 | * | 2/2007 | Schulz et al. | 366/217 |
| 7,188,993 B1 | * | 3/2007 | Howe et al. | 366/111 |

FOREIGN PATENT DOCUMENTS

TW 274741 A 4/1996

* cited by examiner

*Primary Examiner*—Robert A Siconolfi
*Assistant Examiner*—Vu Q Nguyen
(74) *Attorney, Agent, or Firm*—Muncy, Geissler, Olds & Lowe, PLLC

(57) ABSTRACT

An anti-vibration mechanism for dental impression material mixer. The mechanism includes a plurality of supporting poles, a plurality of first elastic springs, a plurality of second elastic springs, a base plate and a restricting board. One end of both the first elastic spring and the second elastic spring are linked to the supporting pole, and the other end is linked to the top and the bottom of a motor respectively. The position of the motor is restricted at a central opening of the restricting board, and the motor is hanging above the base plate. Since the present invention is mainly dependent on the resilient elongation of the first elastic spring and the second elastic spring, which are linked on the top and the bottom of the motor respectively the present invention are absorb the vibration when the motor is operating and enhance the stability of the motor and every mechanism mounted on its top.

8 Claims, 6 Drawing Sheets

ANTI-VIBRATION MECHANISM FOR DENTAL IMPRESSION MATERIAL MIXER

FIELD OF THE INVENTION

The present invention relates to an anti-vibration mechanism and, more particularly, to an anti-vibration mechanism for a dental impression material mixer.

BACKGROUND OF THE INVENTION

In the practice of dentistry, a cast or a mold must be made according to the profile of the patient's teeth during the manufacturing of dentures, and then the dentures are formed according to the cast. The ingredients of the cast are generally chosen from impression materials or plaster. After adding water to these ingredients, the whole mixture is then stirred manually until it has a sticky texture for further utilization. Since the above mixture will solidify and set within a period of time, therefore, owing to the time constraints for manual stirring, the impression materials usually cannot be mixed evenly. Furthermore, the way of stirring manually is quite strenuous and will cause the mixture to form bubbles, thus causing the cast to retain air holes within which results in a rough surface. This defect will greatly affect the product quality of the denatures.

Since the stirring method for dental impression materials is basically manual, there is no specific mixer available. Therefore, in order to solve the above defect, the conventional technology has already disclosed a mixer for mixing dental impression materials (R.O.C. Patent Publication No. 274741). Such a mixer disclosed a transmission device, which mainly utilizes a plurality of planetary gears meshing with each other, thus, allowing the impression materials within the mixer to revolve around the sun gear while processing self-rotation. As a result, the impression materials can be mixed evenly under high-speed rotation while avoiding air bubbles formed within the mixture by the centrifugal force.

It is worth mentioning that in the prior art in FIG. 1 Prior Art and FIG. 2 Prior Art, a chamber 11 and a housing cup 12 of such mixer can be activated by the transmission of several gears 13, so as to perform a high-speed rotation in a reverse direction. In achieving the objective of performing high-speed rotation, such mixer mainly relies on a motor 14 to provide a rotating energy. The motor 14 is hanging on a rectangular seat 15, with each of the four corners of the seat 15 being further perpendicularly equipped with a supporting pole 16. An elastic spring 18 is connecting a fixed member 17 of the supporting pole 16 and a fixed member 19 at the top of the motor 14, so that the motor 14 and every mechanism located on top of it can be hung on the seat 15. The mixer performs anti-vibration effect through the resilient force of the elastic spring 18. However, since the above elastic spring 18 only connects the top of the motor 14 to the seat 15, when the motor 14 is operating, the bottom of the motor 14 might over vibrate because of the unconstrained bottom portion. Such a defect will eventually affect the operation stability of the motor 14 and every mechanism mounted on top.

SUMMARY OF THE INVENTION

It is a primary object of the present invention is to provide an anti-vibration mechanism for a dental impression material mixer, which can enhance the stability of a motor on the mixer and every mechanism mounted on top of the motor during operation.

In order to achieve the foregoing objects, the anti-vibration mechanism for dental impression material mixer of the present invention, mainly includes a plurality of supporting poles, a plurality of first elastic springs, a plurality of second elastic springs, a base plate and a restricting board. The first elastic spring connects a corresponding position at the top end of an adjacent supporting pole and the top of a motor. The second elastic spring connects a corresponding position at the bottom end of the adjacent supporting pole and the bottom of the motor. The base plate is fixedly equipped at the end of each supporting pole. The restricting board consists of a central opening. Each of the above supporting poles passes through the edge corners of the restricting board. The restricting board is fixedly located at the middle portions of those supporting poles. The position of the motor is restricted at the central opening of the restricting board, and the motor is hanging above the base plate. Since the present invention is mainly dependent on the resilient elongation of the first elastic spring and the second elastic spring, which are linked on the top and the bottom of the motor respectively, it can be certain that the present invention can absorb the vibration produced by the operation of the motor thus, enhancing the stability of the motor 14 and every mechanism mounted on its top during operation.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
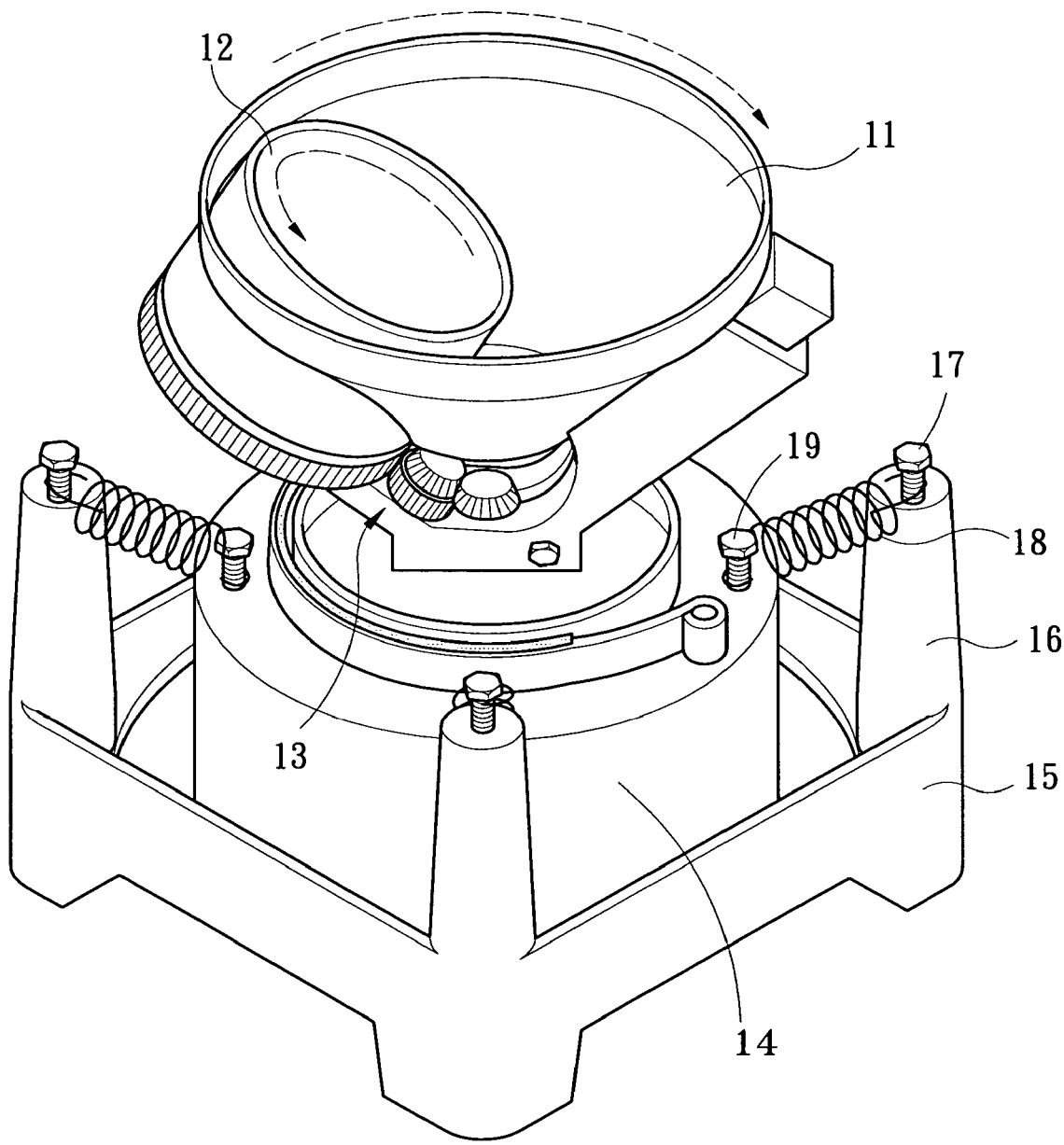
FIG. 1 is a generally perspective view of a conventional dental impression material mixer.
Figure 2:
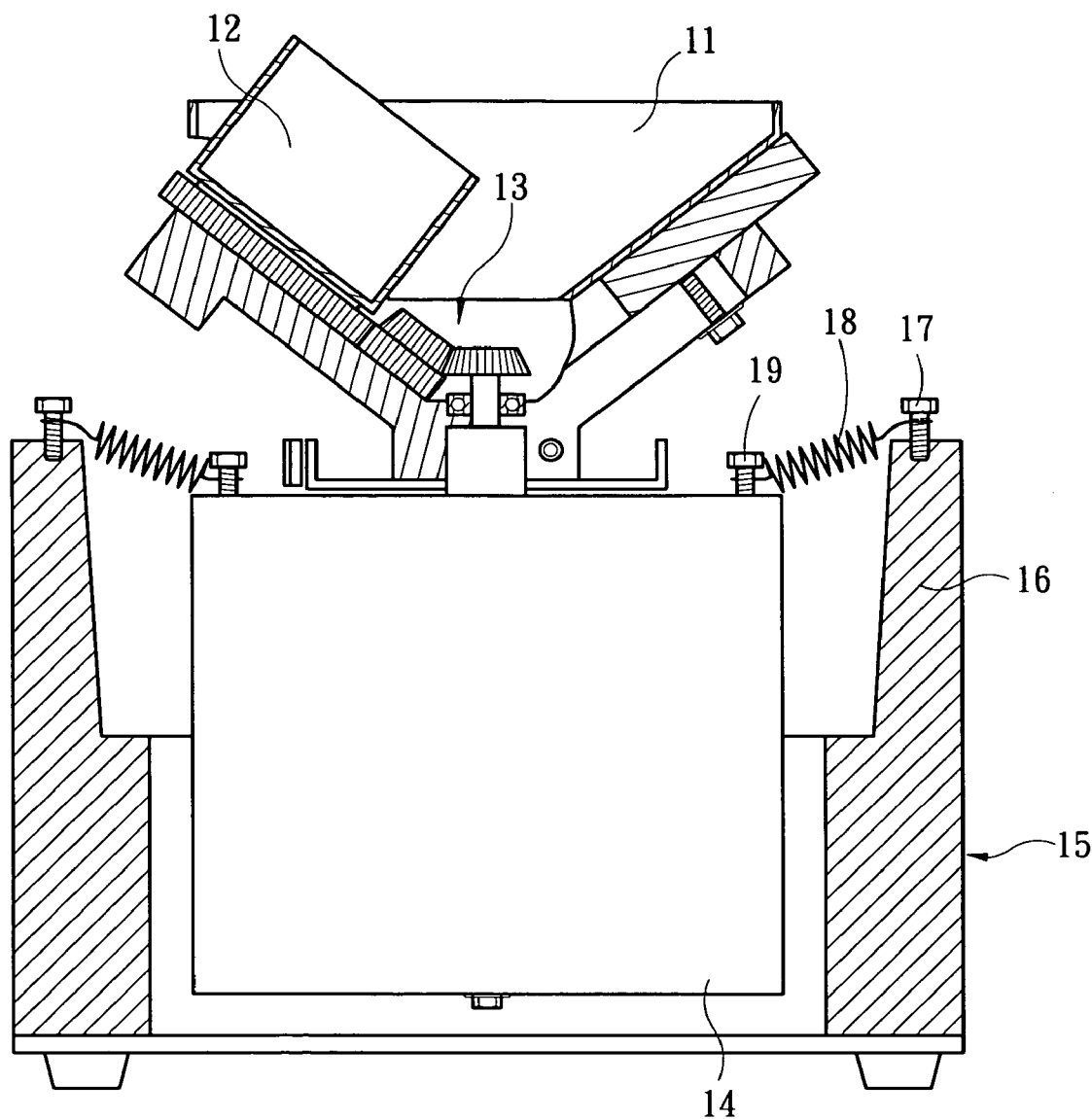
FIG. 2 is a side view of a conventional dental impression material mixer.
Figure 3:
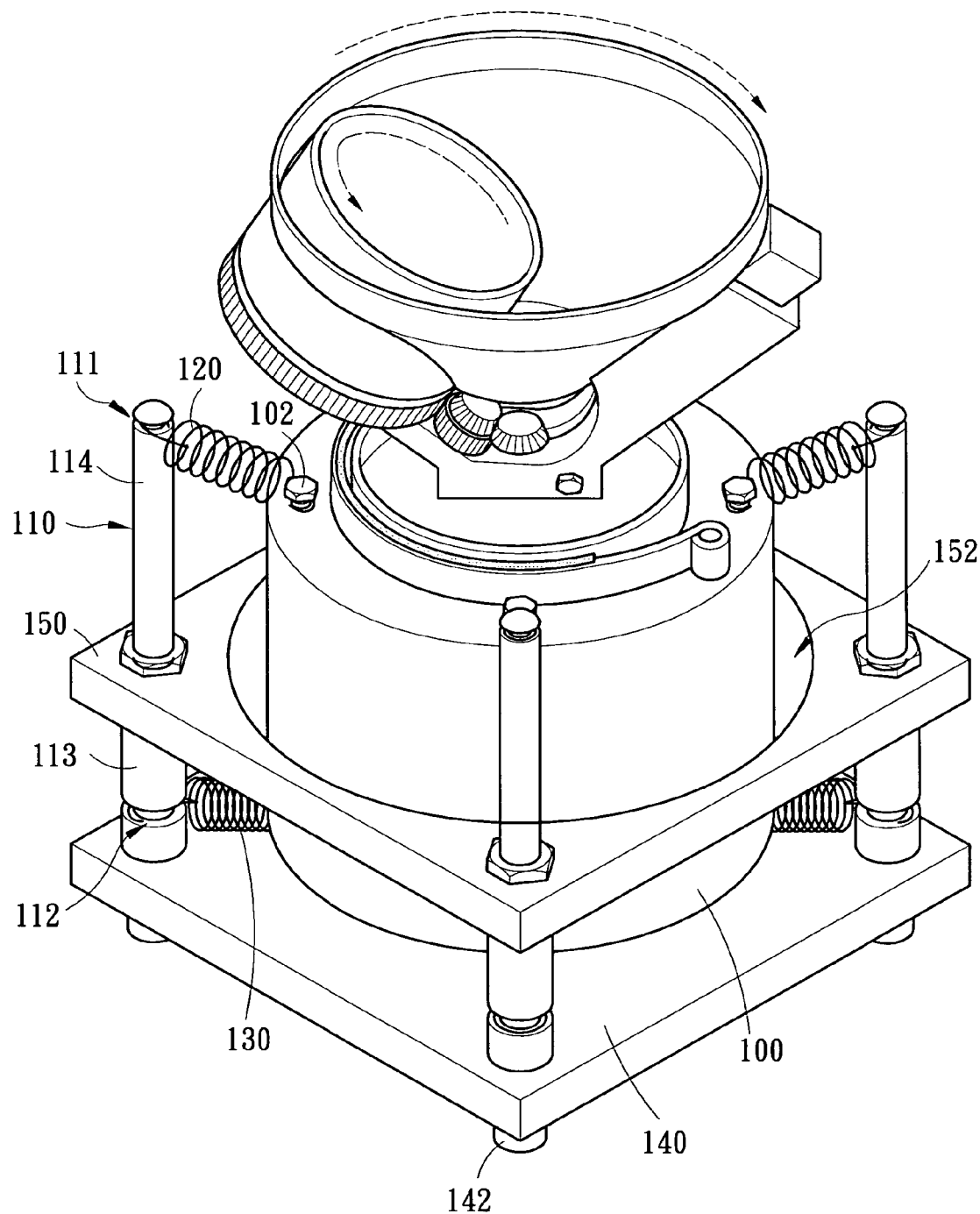
FIG. 3 is a perspective view of a preferred embodiment of the anti-vibration mechanism for dental impression material mixer of the present invention.
Figure 4:
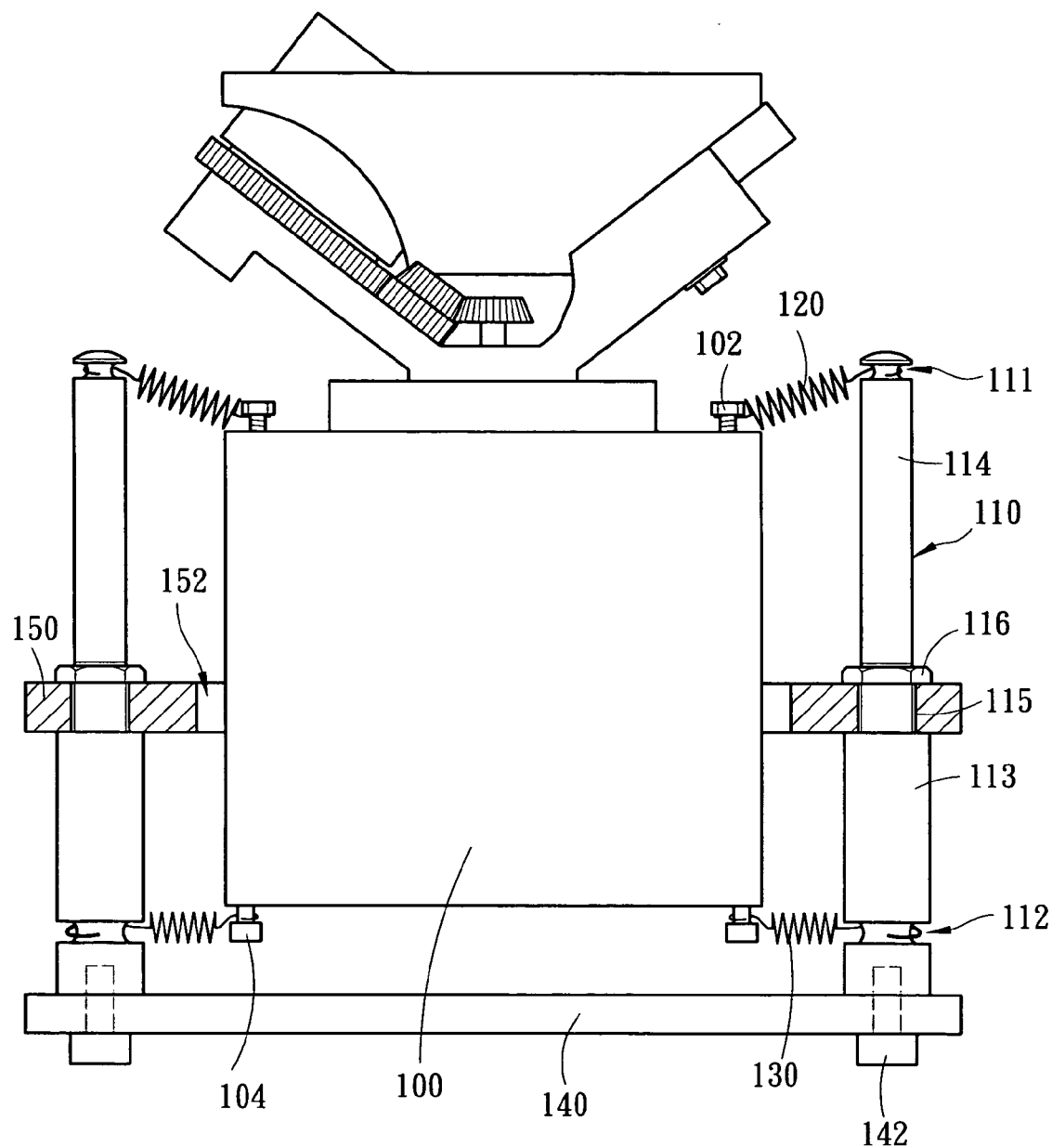
FIG. 4 is a side view of a preferred embodiment of the anti-vibration mechanism for dental impression material mixer of the present invention.
Figure 5:
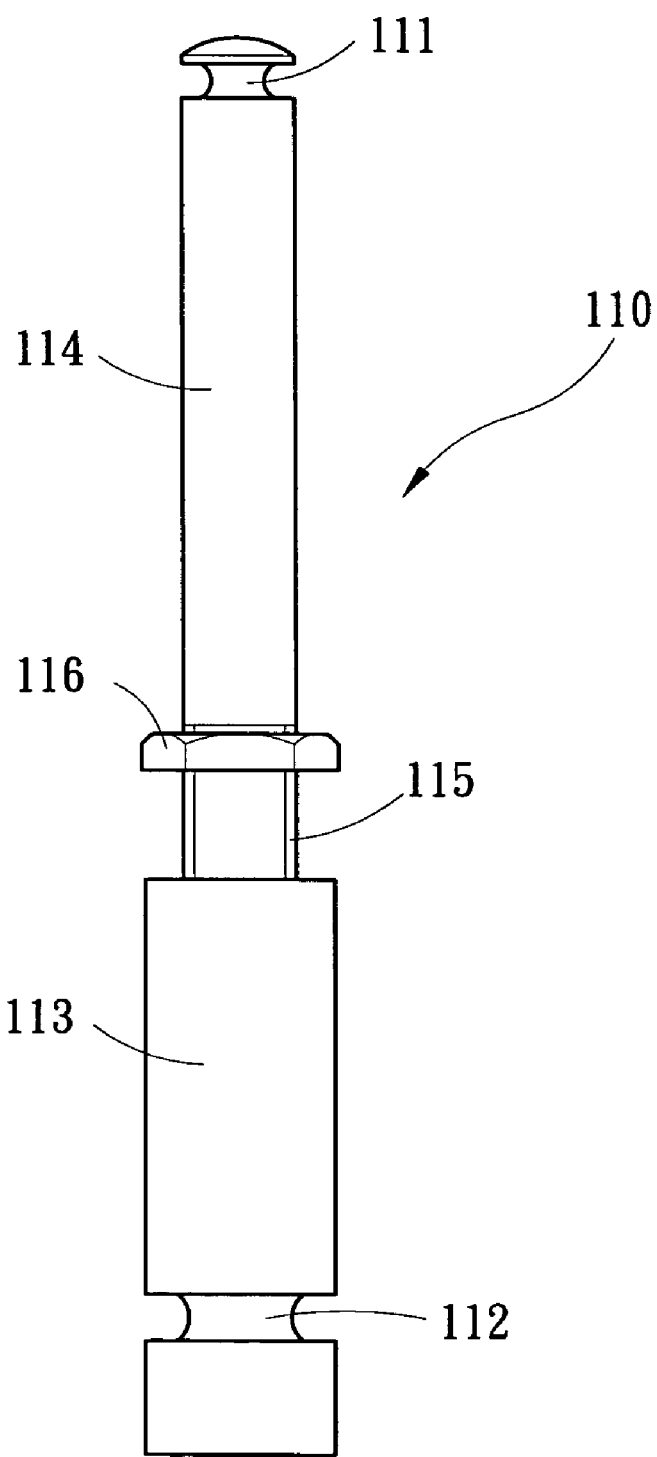
FIG. 5 is a side view of the supporting pole of the anti-vibration mechanism of the present invention.

Firstly, please refer to FIGS. 3 to 5 simultaneously. The anti-vibration mechanism for dental impression material mixer of the preferred embodiment of the present invention, mainly includes a plurality of supporting poles 110, a plurality of first elastic springs 120, a plurality of second elastic springs 130, a base plate 140 and a restricting board 150.

The first elastic spring 120 connects a corresponding position at the top end of an adjacent supporting pole 110 and the top of a motor 100. According to this preferred embodiment, a first notch portion 111 is designed near the top end of each supporting pole 110. One end of the first elastic spring 120 can be fastened on the first notch portion 111 so as to link the supporting pole 110. The top of the motor 100 is mounted with a plurality of fixed members 102 (such amount is equal to the number of the first elastic springs 120). The other end of each first elastic spring 120 can be clasped on the corresponding fixed member 102, so as to link to the top of the motor 100.

The second elastic spring 130 connects a corresponding position at the bottom end of the adjacent supporting pole 110 and the bottom of the motor 100. According to this preferred embodiment, a second notch portion 112 is located near the bottom end of each supporting pole 110. One end of the second elastic spring 130 can be fastened on the second notch portion 112 so as to link the supporting pole 110. The bottom of the motor 100 is mounted with a plurality of fixed members 104, the other end of each second elastic spring 130 can be clasped on the corresponding fixed member 104, so as to link to the bottom of the motor 100 (It is certain that the number of the fixed member 104 can only be one for all the second elastic spring 130 to fasten.). In addition, referring to the side view of the first notch portion 111 and the second notch portion 112 of the above supporting pole 110 (as shown in FIG. 5), each structure is basically a curve surface, where the dimensions of the upper end and lower end reduce gradually to the core of the supporting pole 110 forming a concave. One end of either the first elastic spring 120 and the second elastic spring 130 can be kept into position within the center of those notch portions, so as to strengthen and to fix the position.

The base plate 140 is fixedly equipped at the end of each supporting pole 110. For the present embodiment, the base plate 140 is fixedly mounted at the end of each supporting pole 110 by a plurality of fixed member 142 (As shown in FIG. 4).

The restricting board 150 consists of a central opening 152. Each of the above supporting poles 110 passes through the edge corners of the restricting board 150. And the restricting board 150 is fixedly located at the middle portions of those supporting poles 110. The position of the motor 100 is restricted at the central opening 152 of the restricting board 150, by its linkage to the first elastic spring 120 and the second elastic spring 130 and the motor 100 is hanging above the base plate 140. Please specially refer to FIGS. 4 and 5. According to the present embodiment, each supporting pole 110 further includes a primary body 113 and a secondary portion 114. The circumference of the secondary portion 114 is designed to be less than the circumference of the primary body 113. There are threads 115 on the secondary portion 114 located adjacent to the primary body 113. A nut 116 is fastened on the threads 115. Such nut 116 can fasten and fix the restricting board 150 on the primary body 113 of the supporting pole 110.

Since the present invention is mainly dependent on the resilient elongation of the first elastic springs 120 and second elastic springs 130, which are linked on the top and the bottom of the motor 100 respectively it can be certain that the present invention can absorb the vibration produced by the operation of the motor 100, in comparison with the conventional technology that the elastic spring is only linked between the top of motor and the seat thus, enhancing the stability of the motor 100 and every mechanism mounted on its top (such as a chamber, a housing cup and a plurality of gears and like mechanism) during operation.

Figure 6:
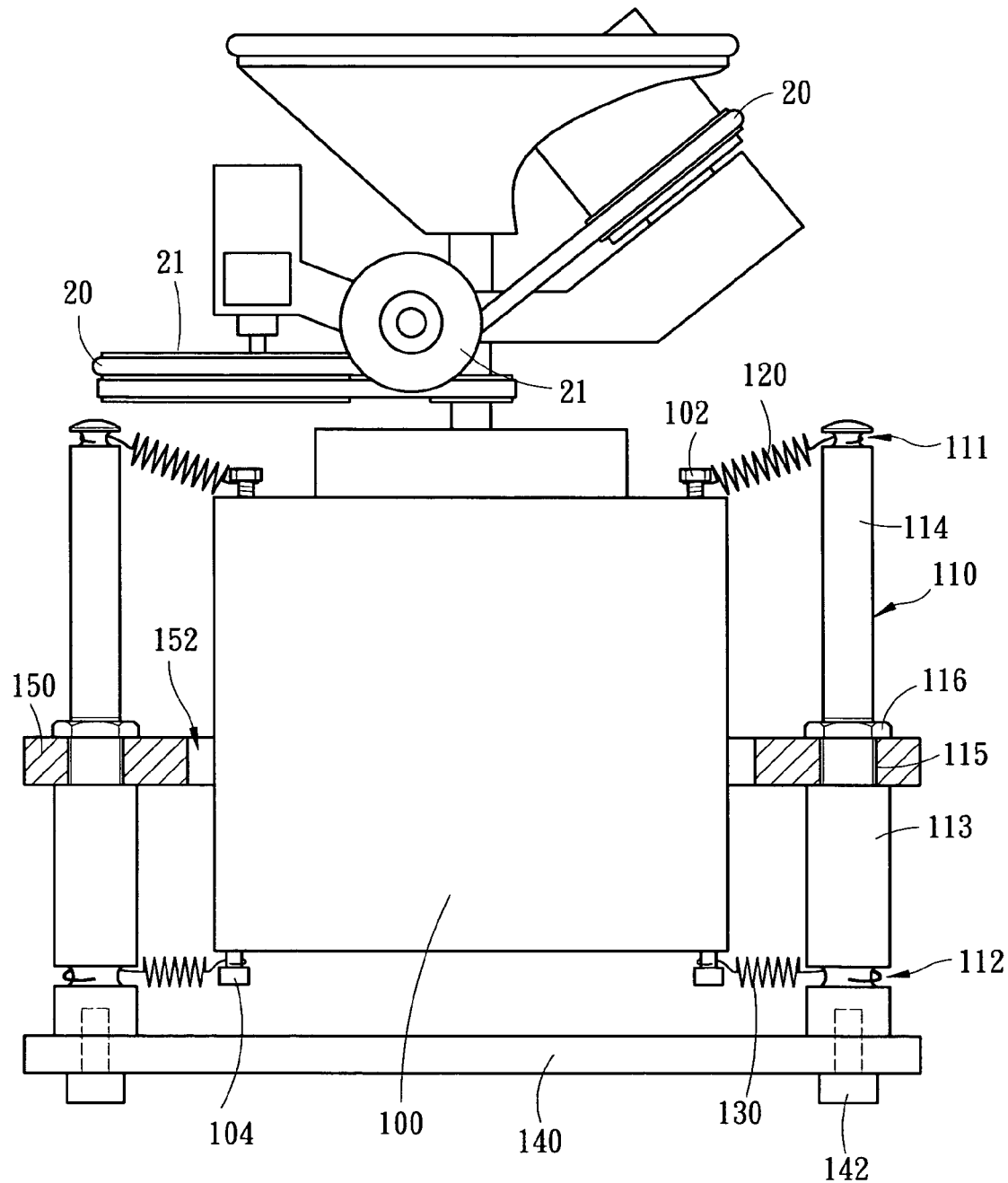
FIG. 6 is a side view of the anti-vibration mechanism of the present invention being assembled on a dental impression material mixer, wherein it is specially illustrated that the transmission device of the mixer comprises belts and pulleys.

Furthermore, the transmission device of the dental impression material mixer of the above embodiment is using an example of mechanism having a plurality of planetary gears. Nevertheless, it is well known to those familiar with the above technique that, the anti-vibration mechanism of the present invention is not limited to only operate with the above specific kind of transmission mechanism. The present invention can also operate with a kind of transmission device comprises of belts 20 and pulleys 21, as illustrated in FIG. 6.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. An anti-vibration mechanism for a dental impression material mixer, for enhancing the stability of a motor and every mechanism mounted on a top of the motor during operation, such anti-vibration mechanism comprising:
    a plurality of vertically extending supporting poles;
    a plurality of first elastic springs, each first elastic spring connecting a corresponding position at a top end of the adjacent supporting pole and a top of the motor;
    a plurality of second elastic springs, each second elastic spring connecting a corresponding position at a bottom end of the adjacent supporting pole and a bottom of the motor;
    a horizontally extending base plate, which is fixedly equipped at the bottom end of each supporting pole;
    a horizontally extending restricting board separate from said supporting poles which consists of a central opening, the central opening being smaller than an area defined by said supporting poles, each of the supporting poles passing through edge corners of the restricting board, the restricting board being fixedly located at the middle portions of the supporting poles, the position of the motor being restricted at the central opening of the restricting board, by its linkage to the first elastic spring and the second elastic spring and the motor hanging above the base plate; and
    each supporting pole further including a primary body and a secondary portion, the circumference of the secondary portion is less than the circumference of the primary body, and there are threads on the secondary portion located adjacent to the primary body, a nut is fastened on the threads, and the nut can fasten and fix the restricting board on the primary body of the supporting pole.

2. The anti-vibration mechanism for dental impression material mixer according to claim 1, wherein the top end of each supporting pole has an integral first notch portion and one end of each first elastic spring can be fastened on the first notch portion so as to link the supporting pole.

3. The anti-vibration mechanism for dental impression material mixer according to claim 1, wherein the top of the motor has a plurality of fixed members and an end of each first elastic spring not connected to said supporting pole can be clasped on the corresponding fixed member.

4. The anti-vibration mechanism for dental impression material mixer according to claim 1, wherein the bottom end of each supporting pole has an integral second notch portion and end of each second elastic spring can be fastened on the second notch portion so as to link the supporting pole.

5. The anti-vibration mechanism for dental impression material mixer according to claim 1, wherein the bottom of the motor has a plurality of fixed members and an end of each second elastic spring not connected to said supporting pole can be clasped on the corresponding fixed member.

6. The anti-vibration mechanism for dental impression material mixer according to claim 1, wherein the base plate is fixedly mounted at the bottom of each supporting pole by a plurality of fixed members.

7. The anti-vibration mechanism for dental impression material mixer according to claim 1, wherein an outer edge of the restricting board extends beyond the supporting poles.

8. An anti-vibration mechanism for a dental impression material mixer, for enhancing the stability of a motor and every mechanism mounted on a top of the motor during operation, such anti-vibration mechanism comprising:

a plurality of vertically extending supporting poles;

a plurality of first elastic springs, each first elastic spring connecting a corresponding position to a top end of the adjacent supporting pole and a top of the motor, the top end of each supporting pole having an integral first notch portion with one end of each first elastic spring being fastened on the first notch portion, a plurality of second elastic springs, each second elastic spring connecting a corresponding position at a bottom end of the adjacent supporting pole and a bottom of the motor, the bottom end of each supporting pole having an integral second notch portion with one end of each second elastic spring being fastened on the second notch portion, a horizontally extending base plate, which is fixedly equipped at the bottom end of each supporting pole;

a horizontally extending restricting board separate from said supporting poles which consists of a central opening, the central opening being smaller than an area defined by said supporting poles, each of the supporting poles passing through edge corners of the restricting board, the restricting board being fixedly located at the middle portions of the supporting poles, an outer edge of the restricting board extending beyond the supporting poles, the position of the motor being restricted at the central opening of the restricting board, by its linkage to the first elastic spring and the second elastic spring and the motor hanging above the base plate; and each supporting pole further including a primary body and a secondary portion, the circumference of the secondary portion is less than the circumference of the primary body, and there are threads on the secondary portion located adjacent to the primary body, a nut is fastened on the threads, and the nut can fasten and fix the restricting board on the primary body of the supporting pole.

* * * * *